3,393,240
7-OXO-7-DESACETYLAMINO-COLCHICINE
COMPOUNDS
Georges Muller, Nogent-sur-Marne, and André Poittevin, Les Lilas, France, assignors to Roussel-UCLAF, Paris, France, a corporation of France
No Drawing. Filed June 10, 1964, Ser. No. 374,168
Claims priority, application France, June 19, 1963, 938,630
17 Claims. (Cl. 260—571)

ABSTRACT OF THE DISCLOSURE 2-oxo-7-desacetylamino-colchicinic compounds of the formula

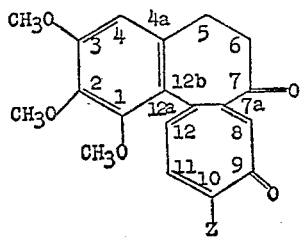

wherein Z is amino, and process for their preparation. The compounds are useful for modifying mitosis.

The novel compounds of Formula I possess interesting pharmacological properties, particularly a strong antimitotic activity in cellular matter undergoing mitosis. They are also useful industrially in agriculture for the modification of mitosis and the creation of polyploids either by drenching the cultivated soil with aqueous solutions or suspensions of the compounds or by preliminary treatment of the seeds with the product per se or dilutions thereof in a solvent or on a support. The compounds are also useful for the preparation of other colchicine compounds with known physiological properties.

It is an object of the invention to provide the novel 7-oxo-7-desacetylamino - colchicine compounds of Formula I.

It is another object of the invention to provide novel intermediates for the 7-oxo-7-desacetylamino-colchicine compounds of Formula I.

It is a further object of the invention to provide a novel process for the preparation of the 7-oxo-7-desacetylamino-colchicine compounds of Formula I.

It is an additional object of the invention to provide novel anti-mitotic compositions.

It is another object of the invention to provide a novel method of modifying mitosis.

These and other objects andl advantages of the invention will become obvious from the following detailed description.

The novel colchicine compounds of the invention have the formula

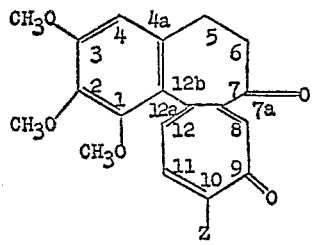

wherein Z is selected from the group consisting of lower alkoxy, amino, lower alkylamino, dilower alkylamino, aralkylamino, and lower alkyl-aralkylamino.

Examples of compounds within the scope of Formula I are 7-oxo-7-desacetylamino-colchicine,
7-oxo-7-desacetylamino-colchiceinamide,
7-oxo-7-desacetylamino-N-methyl-colchiceinamide,
7-oxo-7-desacetylamino-N-benzyl-colchiceinamide,
7-oxo-7-desacetylamino-N-ethyl-colchiceinamide,
7-oxo-7-desacetylamino-N-propyl-colchiceinamide,
7-oxo-7-desacetylamino-N-isopropyl-colchiceinamide,
7-oxo-7-desacetylamino-N-butyl-colchiceinamide,
7-oxo-7-desacetylamino-N,N-dimethyl-colchiceinamide,
7-oxo-7-desacetylamino-N,N-diethyl-colchiceinamide,
7 - oxo - 7 - desacetylamino - N - methyl - N - ethyl-colchiceinamide,
7 - oxo - 7 - desacetylamino - N - methyl - N - benzyl-colchiceinamide,
7 - oxo - 7 - desacetylamino - N - ethyl - N - isopropyl-colchiceinamide, etc.

The novel process of the invention for the preparation of the 7-oxo-7-desacetylamino-colchicine compounds of Formula I comprises reacting N-desacetyl-colchiceine with a chlorinating agent to form N-chloro-N-desacetyl-colchiceine, dehydrochlorinating the latter with an alkaline agent to form 7-imino-7-desacetylamino-colchiceine, subjecting the latter to acidic hydrolysis to form 7-oxo-7-desacetylamino-colchiceine, reacting the latter with a diazo lower alkane to form a mixture of 7-oxo-9-lower alkoxy-10-demethoxy-7-desacetylamino-colchicine and 7-oxo - 10 - lower alkoxy - 9 - demethoxy - 7 - desacetylamino-iso-colchicine, separating the mixture into its components and reacting 7-oxo-10-lower alkoxy-10-demethoxy-7-desacetylamino-colchicine with a compound of the formula

wherein $R_1$ and $R_2$ are selected from the group consisting of hydrogen, lower alkyl and aralkyl to form the corresponding 7-oxo-7-desacetylamino-colchiceinamide. The reaction scheme is illustrated in Table I.

TABLE I

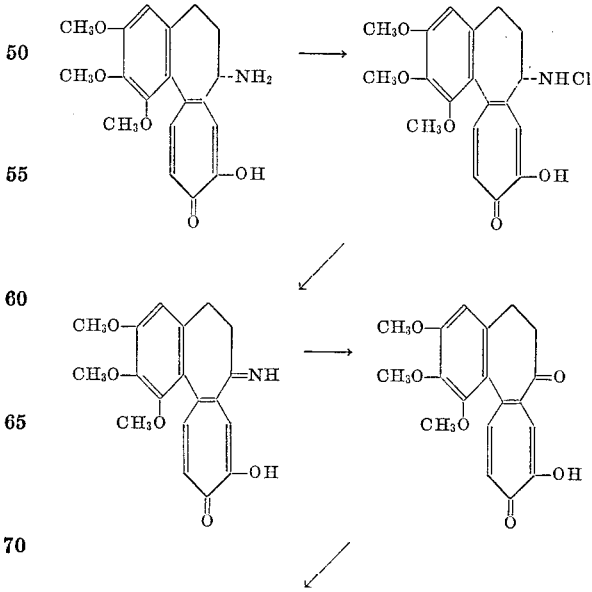

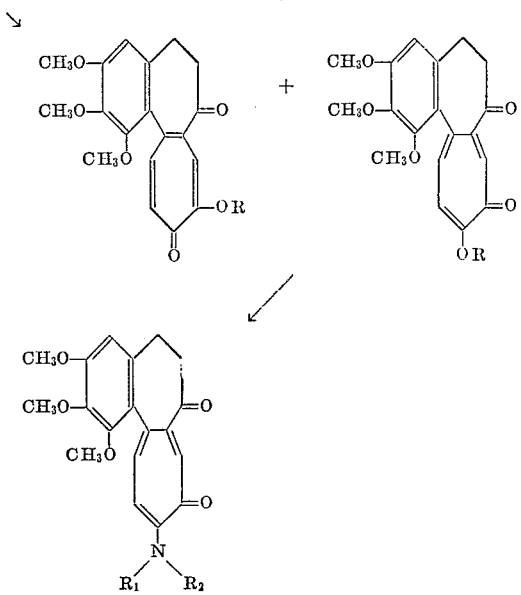

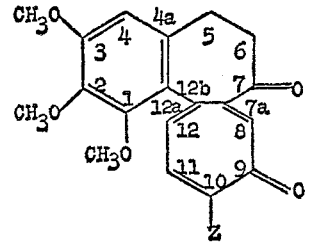

wherein R is lower alkyl and $R_1$ and $R_2$ have the above definition.

It was completely unexpected that the chlorination of N-desacetyl-colchiceine would form a monochloro product and not a polychlorinated product. The said chlorination is preferably effected with N-chloro-succinimide in the presence of an acid such as aqueous acetic acid. This immediately forms N - chloro - N - desacetyl - colchiceine which crystallizes from solution without undergoing superfluous additional chlorination.

The dehydrochlorination of N-chloro-N-desacetylcolchiceine is effected with a strong base such as an alkali metal hydroxide or carbonate, preferably in an alcoholic media such as methanol or ethanol. 7-imino-7-desacetylamino-colchiceine is a relatively stable product as compared ketimines in general and is obtained in good yields.

The hydrolysis of 7-imino-7-desacetylamino-colchiceine is easily effected in the presence of an organic acid such as aqueous acetic acid. The reaction of 7-oxo-7-desacetylamino-colchiceine with a diazo lower alkane such as diazomethane is preferably effected in an organic solvent such as methylene chloride and/or methanol. The separation of the colchicine and iso-colchicine compounds can be effected by fractional crystallization from an organic solvent such as methanol.

The reaction of 7-oxo-10-lower alkoxy-10-demethoxy-7-desacetylamino-colchicine with a nitrogen compound of Formula II is preferably effected in an aqueous or lower alkanolic media at normal temperature, such as room temperature. Examples of suitable compounds of Formula II are ammonia; primary lower alkyl and phenyl lower alkyl amines such as methylamine, benzyl amine, ethyl amine, propyl amine, isopropyl amine, butyl amine, etc. and secondary lower alkyl and phenyl lower alkyl amines such as dimethyl amine, diethylamine, methyl ethyl amine, ethyl isopropyl amine, methyl benzyl amine, etc.

A preferred mode of the process of the invention for the preparation of a 7-oxo-7-desacetylamino-colchicine compound comprises reacting N-desacetyl-colchiceine with N-chlorosuccinimide to form N-chloro-N-desacetyl-colchiceine, dehydrochlorinating the latter with an alkali metal hydroxide such as methanolic potassium hydroxide to form 7-imino-7-desacetylamino-colchiceine, reacting the latter with aqueous acetic acid to form 7-oxo-7-desacetylamino-colchiceine, reacting the latter with diazomethane to form a mixture of 7-oxo-7-desacetylamino-colchicine and 7-oxo-7-desacetylamino-isocolchicine, separating the two components by fractional crystallization and recovering 7-oxo-7-desacetylamino-colchicine which may be reacted further with a nitrogen compound of Formula II if desired to form the corresponding 7-oxo-7-desacetylamino-colchiceinamide.

The novel anti-mitotic compositions of the invention are comprised of 7-oxo-7-desacetylamino-colchicine compounds of the formula

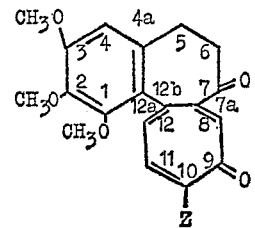

wherein Z is selected from the group consisting of lower alkoxy, amino, lower alkylamino, dilower alkylamino aralkylamino and lower alkyl-aralkyl amino and a major amount of an inert non toxic carrier. The compositions may be in the form of solutions or suspensions, sterile powders, tablets, coated tablets and ointments prepared in the usual manner.

The method of modifying cell mitosis comprises administering an effective amount of a 7-oxo-7-desacetylamino-colchicine compound of the formula wherein Z is selected from the group consisting of lower alkoxy, amino, lower alkylamino, dilower alkylamino, aralkylamino and lower alkyl-aralkyl amino. The said products can be administered orally, subcutaneously or topically.

The effective dose is between 5 and 50 mg. per day in the adult depending upon the method of administration and the specific product. For example, 10 to 50 mg. of 7-oxo-7-desacetylamino-colchicine and 5 to 25 mg. of 7-oxo-7-desacetylamino-N-methyl-colchiceinamide are effective daily doses for the said compounds.

In the following examples there are described several preferred embodiments to illustrate the invention. However, it should be understood that the invention is not intended to be limited to the specific embodiments.

EXAMPLE I.—PREPARATION OF 7-OXO-7-DESACETYLAMINO-COLCHICINE

Step A.—Preparation of N-chloro-N-desacetyl-colchiceine 20 gm. of N-desacetyl-colchiceine were dissolved in 10 cc. of acetic acid and 200 cc. of water while stirring for 5 minutes at ambient temperature. Then, a solution of 8.2 gm. of N-chloro-succinimide in 82 cc. of acetic acid was added thereto at 60° C. and the reaction mixture was stirred for 15 minutes at ambient temperature. The product was vacuum filtered, washed with water and dried in vacuum to obtain 17.2 gm. of N-desacetyl-N-chloro-colchiceine having a melting point of 170 to 174° C. and a specific rotation $[\alpha]_D^{20} = -320° \pm 10°$ (c.=0.5% in chloroform) which was used as such for the following step of the synthesis.

The product occurred in the form of needles insoluble in water, aqueous dilute acids, ether and benzene, slightly soluble in alcohols and soluble in acetone and chloroform.

This compound has not been described in the literature.

Step B.—Preparation of 7-imino-7-desacetylamino-colchiceine 17.2 gm. of N-chloro-N-desacetyl-colchiceine were dissolved in 85 cc. of a 2 N methanolic solution of potassium hydroxide and the solution was allowed to stand for 17 hours at room temperature. Then water was added afted which acetic acid was added dropwise until a pH of 6.5 to 6.7 was obtained. The product was cooled, vacuum filtered, washed with water, triturated in acetone and dried to obtain 12.45 gm. of 7-imino-7-desacetylamino-colchiceine having a melting point of 130° C. (aqueous solvate), which was used as such for the following step of the synthesis.

For analysis, the said product was recrystallized in the methanol and a methanolic solvate having a melting point of 150° C. was obtained which, when recrystallized in ethyl acetate, yielded a product melting at 178° C. This product occurred in the form of needles, insoluble in water, ether and benzene, slightly soluble in acetone, soluble in aqueous dilute acids and alkalis, alcohols and chloroform.

Analysis for ($C_{19}H_{19}O_5N$): Molecular weight=341.35. Calculated: C, 66.85%; H, 5.61%; N, 4.10%, O, 23.44%. Found: C, 66.8%; H, 5.7%; N, 3.8%; O, 23.7%.

This compound is not described in the literature.

Step C.—Preparation of 7-oxo-7-desacetylamino-colchiceine 12.45 gm. of 7-imino-7-desacetylamino-colchiceine were dissolved in 125 cc. of diluted 50% acetic acid and the solution was heated for 30 minutes at 50° C. and 125 cc. of water were slowly added thereto. After scratching, the 7-oxo-7-desacetylamino-colchiceine crystallized from the media. The product was cooled, vacuum filtered, washed with water and dried to obtain 8.7 gm. of 7-oxo-7-desacetylamino-colchiceine having a melting point of 154° C. used without further purification for the next step of the process.

The said product after being recrystallized from a mixture of methylene chloride and ethyl acetate, had a melting point of 157° C. and occurred in the form of little rods insoluble in water, in aqueous dilute acids and alkalis, ether and benzene, slightly soluble in acetone and soluble in alcohols and chloroform.

Analysis for ($C_{19}H_{18}O_6$): Molecular weight=342.33. Calculated: C, 66.66%; H, 5.30%. Found: C, 66.6%; H, 5.4%.

This compound is not described in the literature.

Step D.—Preparation of 7-oxo-7-desacetylamino-colchicine 9.2 gm. of 7-oxo-7-desacetylamino-colchiceine were dissolved in 90 cc. of a 50% mixture of methylene chloride and methanol and the solution was cooled at 0° C. Then, over a period of 10 minutes 180 cc. of a 1% diazomethane solution in methylene chloride were added thereto. The resulting solution was stirred for 1 hour at 0° C. and then a few drops of acetic acid were added and the solution was distilled to dryness under vacuum. The resulting product was taken up in 60 cc. of a mixture of methylene chloride and methanol (1:3) and after the methylene chloride was distilled off, the solution was left standing for 10 minutes to effect precipitation. The precipitate was vacuum filtered and dried to obtain a first crop of 3.78 gm. of 7-oxo-7-desacetylamino-colchicine which upon crystallization from a mixture of methylene chloride and ethyl acetate yielded 2.93 gm. of 7-oxo-7-desacetylamino-colchicine having a melting point of 230° C.

The product occurred in the form of small rectangular rods insoluble in water, aqueous dilute acids and alkalis, ether and benzene, slightly soluble in alcohols and soluble in acetone and chloroform.

Analysis for ($C_{20}H_{20}O_6$): Molecular weight=356.36. Calculated: C, 67.4%; H, 5.66%; Found: C, 67.1%; H, 5.7%.

This compound is not described in the literature.

By fractional crystallization of the methanol mother liquors, 7-oxo-7-desacetylamino-iso-colchicine having a melting point of 190° C. was obtained. The said product occurred in the form of prisms insoluble in water, dilute aqueous acids and alkalis, ether and benzene, slightly soluble in alcohols and acetone and soluble in chloroform.

Analysis for ($C_{20}H_{20}O_6$): Molecular weight=356.36. Calculated: C, 67.40%; H, 5.66%; Found: C, 67.6%; H, 5.7%.

This product is not described in the literature.

EXAMPLE II.—PREPARATION OF 7-OXO-7-DESACETYLAMINO-COLCHICEINAMIDE 100 mg. of 7-oxo-7-desacetylamino-colchicine in 5 cc. of methanol were reacted with 2 cc. of concentrated aqueous ammonia for 24 hours while stirring at room temperature, chloroform was added to the solution, the chloroformic layer was washed with water, dried and distilled to dryness to obtain a residue of 7-oxo-7-desacetylamino-colchiceinamide.

This product is not described in the literature.

EXAMPLE III.—PREPARATION OF THE 7-OXO-7-DESACETYLAMINO - N - METHYLCOLCHICEINAMIDE 850 mg. of 7-oxo-7-desacetylamino-colchicine, dissolved in 25 cc. of methanol, were reacted with 25 cc. of an aqueous solution of 36% mono methylamine. The mixture was allowed to stand while stirring for a period of 18 hours at 20° C. and then was extracted with methylene chloride. The extract was washed with water and distilled to dryness. The residue was crystallized from a mixture of ethyl acetate and ether (2:3) to obtain 490 mg. (yield: 57%) of product having a melting point of 213° C. By recrystallization from a mixture of methylene-chloride and methanol, 400 mg. of 7-oxo-7-desacetylamino-N-methyl-colchiceinamide melting at 215° C. were obtained.

The product occurred in the form of small yellow rods and hexagonal prisms insoluble in water, benzene and ether, slightly soluble in ethanol and soluble in chloroform and acetone.

Analysis for ($C_{20}H_{21}O_5N$): Molecular weight=355.38. Calculated: C, 67.59%; H, 5.96%; N, 3.94%. Found: C, 67.6%; H, 6.0%; N, 4.2%.

This compound is not described in the literature.

EXAMPLE IV.—PREPARATION OF 7 - OXO - 7-DESACETYLAMINO - N - BENZYL-COLCHICEINAMIDE 120 mg. of 7-oxo-7-desacetylamino-colchicine in solution in 5 cc. of methanol, were reacted with 1 cc. of benzylamine. The reaction mixture was allowed to stand at room temperature for 48 hours and then chloroform was added. The chloroformic layer was washed with water, with 0.1 N hydrochloric acid and with water, air dried and distilled to dryness to obtain a residue of 7-oxo-1-desacetylamino-N-benzyl-colchiceinamide.

This product is not described in the literature.

In an analogous fashion by reacting the appropriate amine with 7-oxo-7-desaceylamino-colchicine, the following 7-oxo-7-desacetylamino-colchiceinamides have been prepared:

7-oxo-7-desacetylamino-N-ethyl-colchiceinamide;
7-oxo-7-desacetylamino-N-propyl-colchiceinamide;
7-oxo-7-desacetylamino-N-isopropyl-colchiceinamide;
7-oxo-7-desacetylamino-N-butyl-colchiceinamide;
7-oxo-7-desacetylamino-N,N-dimethyl-colchiceinamide;

7-oxo-7-desacetylamino-N,N-diethyl-colchiceinamide;
7-oxo-7-desacetylamino-N-methyl-N-ethyl-colchiceinamide;
7-oxo-7-desacetylamino-N-methyl-N-benzyl-colchiceinamide; and
7-oxo-7-desacetylamino-N-ethyl-N-ispropyl-colchiceinamide.

Pharmacological study

The antimitotic activity of 7-oxo-7 - desacetylamino-colchicine and 7-oxo-7 - desacetylamino - N - methyl-colchiceinamide was studied according to the method described by Jequier et al., Arch. Int. Pharmacodyn., vol. 103, 1955, p. 243. This method is based on the following facts:

(1) In the rat, the mitotic index of the femoral bone marrow (i.e.: cells in mitosis/total number of cells) is almost the same on smears taken from diverse regions and on several fields of the same smear. This mitotic index (as defined above) is normally between 10 and 20 per thousand.

(2) After subcutaneous injection of antimitotic colchicinic derivatives, such as for example, colchicine, which blocks the division of cells at an intermediary state of mitosis, this index rises and attains its maximum at about the sixth hour.

(3) The increase observed is a function of the dose administered. The correlation is clearly shown by a curve in the form of an S whose point of inflexion occurs at about the mitotic index 100 per housand.

Thus, the antimitotic dose (DAM 100) defined as being that which furnishes 100 cells in mitosis per 1,000 cells is chosen as a measure of the stathmocinetic activity of the products studied.

The standard technique utilized is the following:

(1) Subcutaneous injection of several doses of the substance to be studied is given to groups of two or three rats. The volume injected is always 0.2 cc. per 100 gm. of body weight.

(2) The animals are sacrificed six hours after the injection, the femoral bone marrow is separated and the preparation of smears and coloration by the May Grunwald-Giemsa stain is followed. 1,000 cells in each preparation are counted.

(3) The DAM 100 is determined according to the graphic representation of the mitotic indexes drawn up as a function of the logarithm of the dose.

The DAM 100 of 7-oxo-7-desacetylamino-colchicine was 1.4 mg./kg. and that of 7-oxo-7-desacetylamino-N-methyl-colchiceinamide was 0.7 mg./kg. as compared to the DAM 100 of colchicine which was 0.7 mg./kg. under the same conditions.

Determination of toxicity

The test of toxicity was effected on mice of the Rockland strain weighing between 18 and 22 gm. The products studied placed in aqueous suspension were administered intraperitoneally to groups of mice at increasing doses. The animals were held under observation for one week.

The lethal dose ($LD_{50}$) determined according to the graphic method of Miller et al. (Proc. Soc. Exp. Biol., 1944, vol. 57, p. 261) was 56±7 mg./kg. for 7-oxo-7-desacetylamino-colchicine and 54±5 mg./kg. for 7-oxo-7-desacetylamino-N-methyl-colchiceinamide as compared to 2 mg./kg. of colchicine. Therefore, the therapeutic index ($DL_{50}/DAM\ 100$) for 7-oxo-7-desacetylamino-colchicine is about 40 and for 7-oxo-7 - desacetylamino-N-methyl-colchiceinamide is about 77 as compared to about 2.8 for colchicine. It can be easily seen that products of the invention have a much more favorable therapeutic safety margin than colchicine.

Various modifications of the compostions and process of the invention may be made without departing from the spirit or scope thereof, and it is to be understood that the invention is to be limited only as defined in the appended claims.

We claim:
1. 7-oxo-7 - desacetylamino-colchicinic compounds of the formula

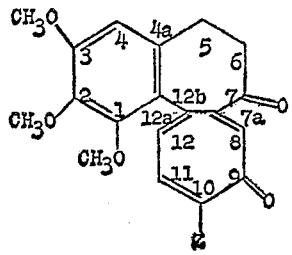

wherein Z is selected from the group consisting of amino, lower alkylamino, and dilower alkylamino.

2. 7-oxo-7-desacetylamino-colchiceinamide.
3. 7-oxo-7-desacetylamino-N-methyl-colchiceinamide.
4. 7-oxo-7-desacetylamino-N-ethyl-colchiceinamide.
5. 7-oxo-7-desacetylamino-N-propyl-colchiceinamide.
6. 7-oxo-7 - desacetylamino - N-isopropyl-colchiceinamide.
7. 7-oxo-7-desacetylamino-N-butyl-colchiceinamide.
8. 7 - oxo - 7-desacetylamino-N,N-dimethyl-colchiceinamide.
9. 7 - oxo - 7 - desacetylamino-N,N-diethyl-colchiceinamide.
10. 7 - oxo - 7 - desacetylamino-N-methyl-N-ethyl-colchiceinamide.
11. 7 - oxo - 7 - desacetylamino-N-ethyl-N-isopropyl-colchiceinamide.
12. N-chloro-N-desacetyl-colchiceine.
13. A process for the preparation of 7-oxo-7-desacetylamino-colchicinic compounds of the formula

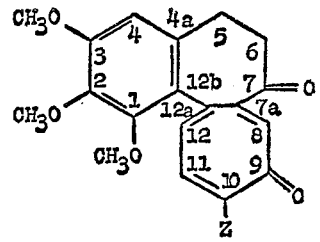

wherein Z is selected from the group consisting of amino, lower alkylamino, and dilower alkylamino which comprises reacting N-desacetyl-colchiceine with a chlorinating agent to form N-chloro-N-desacetyl-colchiceine, dehydrochlorinating the latter with an alkaline agent to form 7-imino-7-desacetylamino-colchiceine, subjecting the latter to acidic hydrolysis to form 7-oxo-7-desacetylamino-colchiceine, reacting the latter with a diazo lower alkane to form a mixture of 7-oxo-9-lower alkoxy-9-demethoxy-7-desacetylamino-colchicine and 7-oxo-10-lower alkoxy-10-demethoxy-7-desacetylamino-iso-colchicine, separating the mixture into its components and reacting 7-oxo-10-lower alkoxy-10-demethoxy-7-desacetylamino-colchicine with a compound of the formula

wherein $R_1$ and $R_2$ are selected from the group consisting of hydrogen and lower alkyl to form the corresponding 7-oxo-7-desacetylamino-colchiceinamide.

14. The process of claim 13 wherein the chlorinating agent is N-chloro-succinimide.
15. The process of claim 13 wherein the dehydrochlorination is effected with methanolic potassium hydroxide.
16. The process of claim 13 wherein the diazo lower alkane is diazo methane.

17. A process for the preparation of a 7-oxo-7-desacetylamino-colchicine of the formula

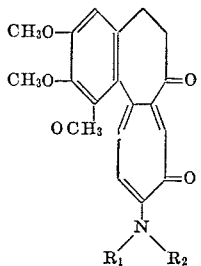

wherein $R_1$ and $R_2$ are selected from the group consisting of hydrogen and lower alkyl which comprises reacting N-desacetyl-colchiceine with N-chlorosuccinimide to form N-chloro-N-desacetyl-colchiceine, dehydrochlorinating the latter with a methanolic alkali metal hydroxide to form 7-imino-7-desacetylamino-colchiceine, reacting the latter with aqueous acetic acid to form 7-oxo-7-desacetylamino-colchiceine, reactin the latter with diazomethane to form a mixture of 7-oxo-7-desacetylamino-colchicine and 7-oxo-7-desacetylamino-isocolchicine, recovering 7-oxo-7-desacetylamino-colchicine from said mixture by frictional crystallization and reacting the latter with a compound of the formula

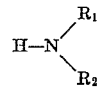

wherein $R_1$ and $R_2$ have the above definition to form the corresponding 7-oxo-7-desacetylamino-colchiceinamide.

References Cited

UNITED STATES PATENTS 3,249,638  5/1966  Muller et al. _____ 260—571

CHARLES B. PARKER, *Primary Examiner.*

JOSEPH P. BRUST, *Examiner.*

R. V. HINES, P. IVES, *Assistant Examiners.*